Figure 1:
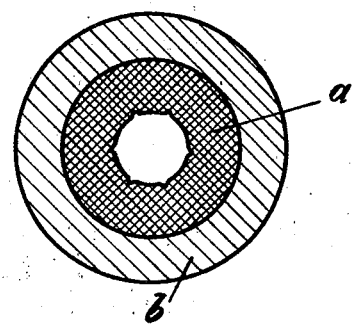

May 20, 1924.　　　　　O. MADER　　　　　1,495,027

HIGH PRESSURE PIPE

Filed May 7, 1923

Inventor:
Otto Mader by Reinhardt
Attorney.

Patented May 20, 1924.

1,495,027

UNITED STATES PATENT OFFICE.

OTTO MADER, OF DESSAU, GERMANY, ASSIGNOR TO HUGO JUNKERS, OF DESSAU, GERMANY.

HIGH-PRESSURE PIPE.

Application filed May 7, 1923. Serial No. 637,282.

*To all whom it may concern:*

Be it known that I, OTTO MADER, a citizen of Germany, residing at Dessau, Germany, have invented certain new and useful Improvements in High-Pressure Pipes, of which the following is a specification.

My invention relates to high-pressure pipes as well as to a method of making such pipes, and to means for connecting them with other pipes and the like. More especially my invention relates to pipes serving to conduct liquids or gases under high pressure and having a comparatively small inner diameter.

While it is not difficult to manufacture pipes for high pressures, for instance up to 1000 atmospheres, if the inner diameter is so large that the pipes can be drawn over a mandrel or can be milled, it has hitherto been impossible to produce, in a manner warranting reliability of operation, pipes of comparatively small inner diameter, such, for instance, as from 1 to 5 mms., and capable of withstanding a pressure such as above mentioned. There is a strong demand for absolutely reliable high-pressure pipes of small diameter, such pipes being required, for instance, for the fuel supply conduits of oil motors in which the fuel is made to pass through the conduit under a very high pressure in order to affect a sufficiently intimate atomization. The volume of liquid contained in such pipes should be only small in order that but as small a quantity of oil as possible be subjected to the high pressure, in order to prevent the control of the injection from being affected by reason of the compressibility of the liquid fuel.

The insufficient resistivity of pipes with small inner diameter is caused by the inner wall of the pipe presenting small fissures resulting from the excessively high tension arising in the wall of the pipe while it is being made, these fissures getting larger frequently while the pipe is in use, or causing the pipe to tear up. These drawbacks cannot be obviated even by the use of comparatively thick walled pipes.

My invention provides a reliable high-pressure pipe with small inner diameter in the following manner:

I provide a pipe the inner diameter of which is so great that the inner surface is sure to be free from fissures. In order to attain the requisite small inner diameter, another pipe having a boring of correspondingly small inner diameter is inserted in the pipe first-mentioned and the two pipes are then brought into intimate contact, whereby the outer pipe with its superior mechanical strength is made to take up part of the strain to which the inner pipe is exposed, especially at those places where the inner pipe cannot withstand this strain owing to the fissures in its wall.

A preferred method of making the compound pipe of the kind described is the following: The outer pipe, the inner surface of which is, as a rule, not quite smooth, nor the section accurately circular and which is frequently covered with scale is, first of all, cleansed by means of scrapers, preferably several scrapers of increasing diameter which are applied one after another until the tube is sufficiently clean and smooth. The inner diameter of the outer pipe must be so large that it just permits pushing the inner pipe in. The two pipes are now drawn through several draw plates of decreasing diameter or the compound pipe is caused to pass between suitably grooved rolls, the effect being in either case that the outer pipe applies itself closely to the inner one.

I prefer employing an outer pipe consisting of steel of great strength, whereas the inner pipe may consist of a softer material, such, for instance, as iron or copper.

In order to effect a reliable connection between two such compound pipes with each other or with part of an engine, such, for instance, as a pump cylinder or a valve casing or the like, special means must be resorted to. The usual manner of connecting a pipe with a branch or other member by means of a screw-thread and by soldering is not free from objections, as a connection of this kind cannot easily be kept tight.

According to my invention, I cause the inner pipe to extend farther into the branch or other jointing member than the outer pipe. In order to attain a tight connection, it is particularly useful to cause the inner pipe to extend right through the jointing member so that it projects from it, the projecting portion being cut off only after the soldering has been effected.

In the drawings affixed to this specification and forming part thereof my invention is illustrated diagrammatically by way of example. In the drawings—

Figure 1 is a cross section of a high-pressure compound pipe according to the present invention, drawn to an enlarged scale.

Figure 2:
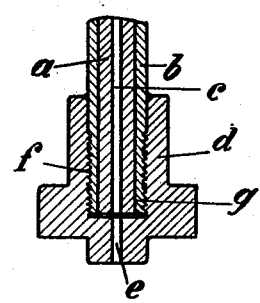
Figure 3:
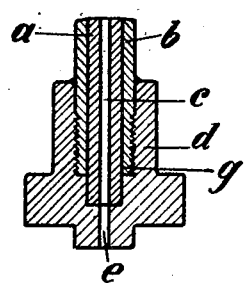
Figure 4:
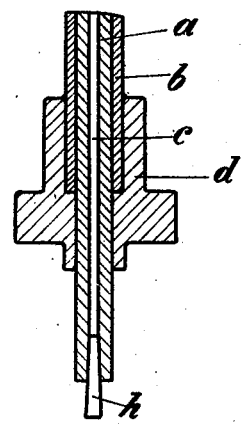

Figures 2, 3, and 4 are longitudinal sections of connections for high-pressure compound pipes, drawn to natural size.

In Figure 1 $b$ is the outer pipe manufactured so as to have a smooth inner surface, and $a$ is the inner pipe which completely fills up the outer one, the diameter of the boring $c$ of the inner pipe being from 1 to 5 mms. The inner surface of wall of this boring is rough or uneven and has cracks or fissures, as indicated in the drawing.

Figure 2 illustrates the mode of connecting the end of a compound high-pressure pipe with a jointing member, this connection being such as ordinarily used for connecting ordinary tubes. The end faces of the pipes $a$ and $b$ terminate in the same plane, and the entire compound tube is screwed at $f$ into a socket-like jointing member $d$, having a narrow boring $e$ in alignment with the boring $c$ of the compound tube. This involves the drawback that the annular space between the end of the pipes $a$ and $b$ and the connecting member is liable not to be filled up with solder, so that air can be retained in this place which may give rise to serious troubles.

This connection can be materially improved by causing the inner tube to project beyond the outer one, and by correspondingly shaping the inner end of the bore of the jointing member, as shown in Figure 3. The inner tube $a$ extends deeper into the member $d$, whereby the joint between the inner end of the boring $e$ and the compound pipe is elongated and rendered correspondingly tighter.

This connection, although being superior to the one illustrated in Figure 2, involves a drawback which is due to the soldering. It has been found that the liquid solder tends to enter the narrow passages $e$ and $c$ at their point of meeting, and to fill them up by capillary action. It is difficult to remove the solder by boring out, this procedure involving also the danger of rendering the walls uneven.

In order to prevent this, I prefer employing the connection illustrated in Figure 4. The inner pipe $a$ here extends through the bottom of the jointing member $d$ so as to project beyond it, and the end of the boring of the pipe $a$ is closed by a metal pin $h$ or the like. The outer pipe $b$ only extends to the inner surface of the bottom. The parts are then soldered together and the solder can now flow through between the contacting surfaces without being able to obstruct the passage $c$, the connection hereby obtained being so perfect that the screw-thread $f$ (Figs. 2 and 3) may be dispensed with entirely. After the soldering operation has been carried through, the projecting end of the pipe $a$ is cut off.

I wish it to be understood that I do not desire to be limited to the exact details of construction shown and described, for obvious modifications will occur to a person skilled in the art.

I claim:—

1. High pressure tube of small internal diameter comprising in combination an inner capillary tube having the desired diameter, an outer tube tightly drawn onto said inner tube and a jointing piece surrounding the end of the compound tube, the inner tube projecting farther into said jointing piece than the outer tube, and solder flowed into the joint between said tube and the jointing piece.

2. High pressure tube of small internal diameter comprising in combination an inner capillary tube having the desired diameter, an outer tube tightly drawn onto said inner tube and a jointing piece surrounding the end of the compound tube, means sealing the tube to the jointing piece, the inner tube projecting farther into said jointing piece than the outer tube and projecting through the bottom of said jointing piece.

3. The method of making a joint on compound tubes of small internal diameter, consisting in introducing such tube into a jointing piece with the inner part of said tube projecting on the other side of said jointing piece, introducing solder between said tubes and said piece and cutting off the projecting end of said inner part.

In testimony whereof I affix my signature.

OTTO MADER.